United States Patent [19]

Tessmer

[11] Patent Number: 5,378,058
[45] Date of Patent: Jan. 3, 1995

[54] SERVICE PEDESTAL

[75] Inventor: Wallace D. Tessmer, Sacramento, Calif.

[73] Assignee: Tesco Controls, Inc., Sacramento, Calif.

[21] Appl. No.: 87,053

[22] Filed: Jul. 7, 1993

[51] Int. Cl.⁶ .............................................. A47B 77/08
[52] U.S. Cl. ................................ 312/298; 312/223.6; 361/641; 361/659
[58] Field of Search ...................... 312/223.6, 298, 283, 312/284; 361/641, 659, 664

[56] References Cited

U.S. PATENT DOCUMENTS

| | | | |
|---|---|---|---|
| 2,885,253 | 5/1959 | Kesling | 312/298 X |
| 3,906,295 | 9/1975 | Tessmer | 361/643 |
| 4,791,244 | 12/1988 | Taybl | 312/284 X |
| 5,160,188 | 11/1992 | Rorke | 312/223.6 X |
| 5,239,129 | 8/1993 | Ehrenfels | 361/641 X |

Primary Examiner—Richard E. Gluck
Attorney, Agent, or Firm—Mark C. Jacobs

[57] ABSTRACT

An improved electrical service pedestal is provided, which has a lower portion and an upper portion, the latter of which features a pivotally mounted first section to permit easy access to a meter disposed there within. A second section disposed forward of the front of the first section is independently openable to permit a clear viewing of a meter disposed within the apparatus. The lower portion includes an openable front door, spaced from an openable interior door as well as a stepped and swept or other raceway for the wiring from the utility to the user's meter. Access to the raceway is gained through a removable side door.

43 Claims, 10 Drawing Sheets

SERVICE PEDESTAL

FIELD OF THE INVENTION

1. BACKGROUND OF THE INVENTION

This invention relates to electrical service pedestals and, more particularly, to a pedestal having easy access to the work space service therein, which pedestal serves as the connecting point between an electric utility's termination point for electrical service, and the delivery of electricity to and the control of traffic lights, railroad semaphores, street lights and the like.

2. DESCRIPTION OF THE PRIOR ART

Service pedestals for the junction of the electric company's electrical service and a municipality, or other government or private entity control and operation of electrical signals and lights are known and used throughout the country. One such pedestal was patented back in 1975 by this applicant, and bears U.S. Pat. No. 3,906,295.

During the time frame in which this formerly patented apparatus has enjoyed commercial success, the makeup of the work force in the U.S. and other countries has been changing. Laws concerning occupational safety and health have been changing. New types of workers such as women and those with certain physical disabilities now form part of the work force. The needs of this last group of workers are being given special attention in the design of products for home and industry.

Upon due reflection after reviewing input from various sources applicant determined that there indeed existed a need for an improved service pedestal.

It is an object therefore of this invention to provide an improved service pedestal that is maximally accessible for the installation of wiring and for the installation of the meter.

It is another object to provide a service pedestal wherein the main wire carrying section's cover is completely removable.

It is a further object of the invention to provide a service pedestal wherein the top cover unit is completely removable.

It is a yet further object to provide a service pedestal wherein the top cover is pivotable for direct access to the meter disposed within the upper compartment.

It is an additional object to provide a swept raceway in a service pedestal having a side access.

It is still further object to provide a service pedestal which when metered can be readily serviced by handicapped personnel.

Other objects of the invention will in part be obvious and will in part appear hereinafter.

The invention accordingly comprises the apparatus possessing the features, properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF THE INVENTION

An improved service pedestal having an upper portion and a lower portion is provided. The upper portion features a pivotally mounted first section to a third section to permit easy access to a meter disposed within said third section. A second section disposed to the front of the first section is openable without opening the entire first section to obtain a clear direct view of a meter within the line of sight.

The lower portion includes a front door, to permit access to circuit breakers and/or other switches mounted on an openable interior door. A stepped and swept or other raceway may be provided for the wiring from the utility to the user's meter. Access to the raceway is gained through a removable side door. In most instances this will be the left lower door.

DESCRIPTION OF THE PREFERRED EMBODIMENT

The apparatus of this invention 10 consists of two portions an upper portion 11 and a lower portion 12. The upper portion 11 is divided into two sections a major section which is the first section designated 13 and a second smaller section designated 15 appended thereto forwardly thereof, and an upper body or third section 14. First section 13 is best seen in FIGS. 1 through 6 inclusive, whereas the lower portion 12 is shown best in FIGS. 13, 15, 16, 17 and 22.

Figure 1:
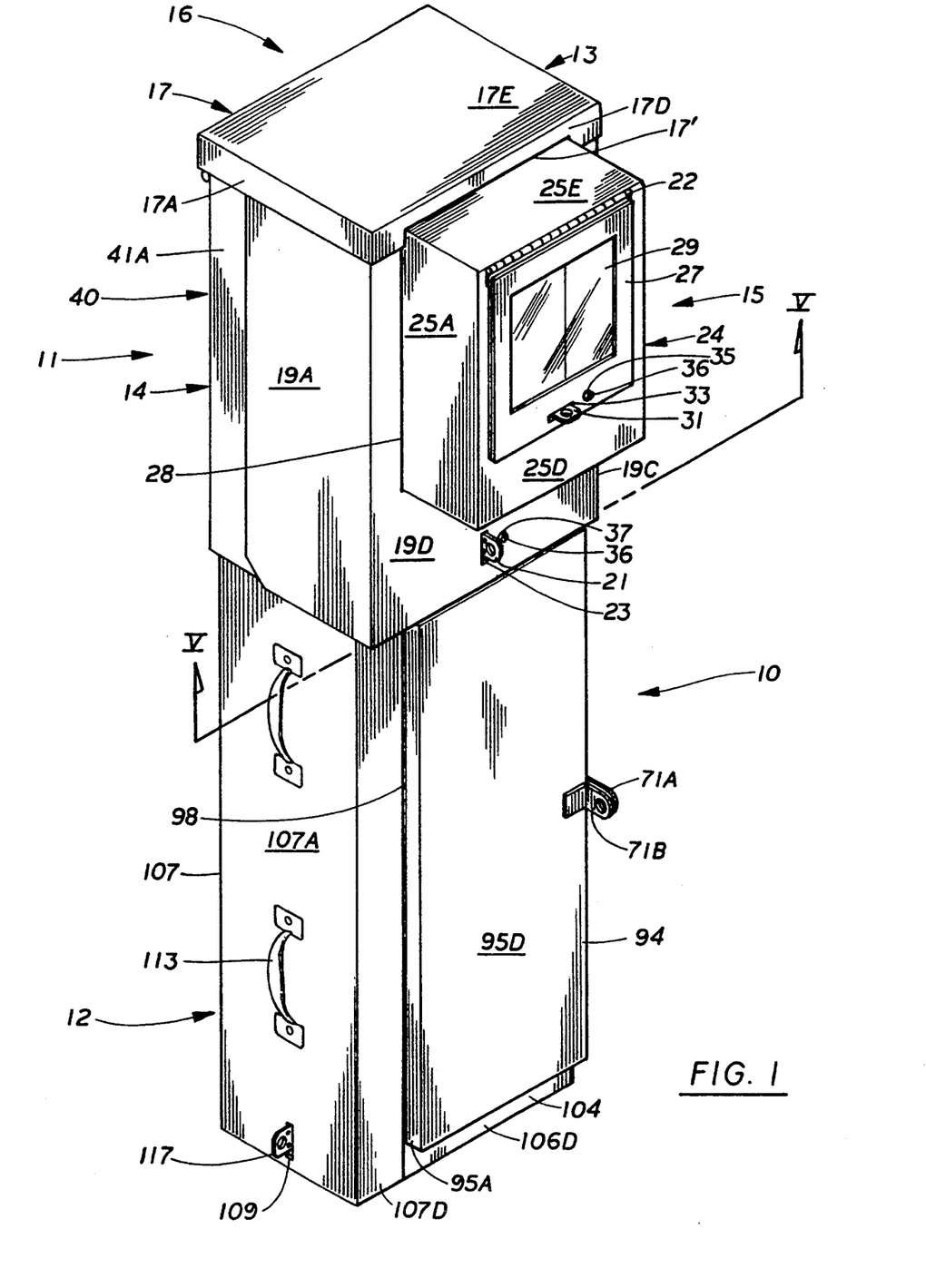
FIG. 1 is a left front perspective view of the device of this invention.
Figures 5, 6:
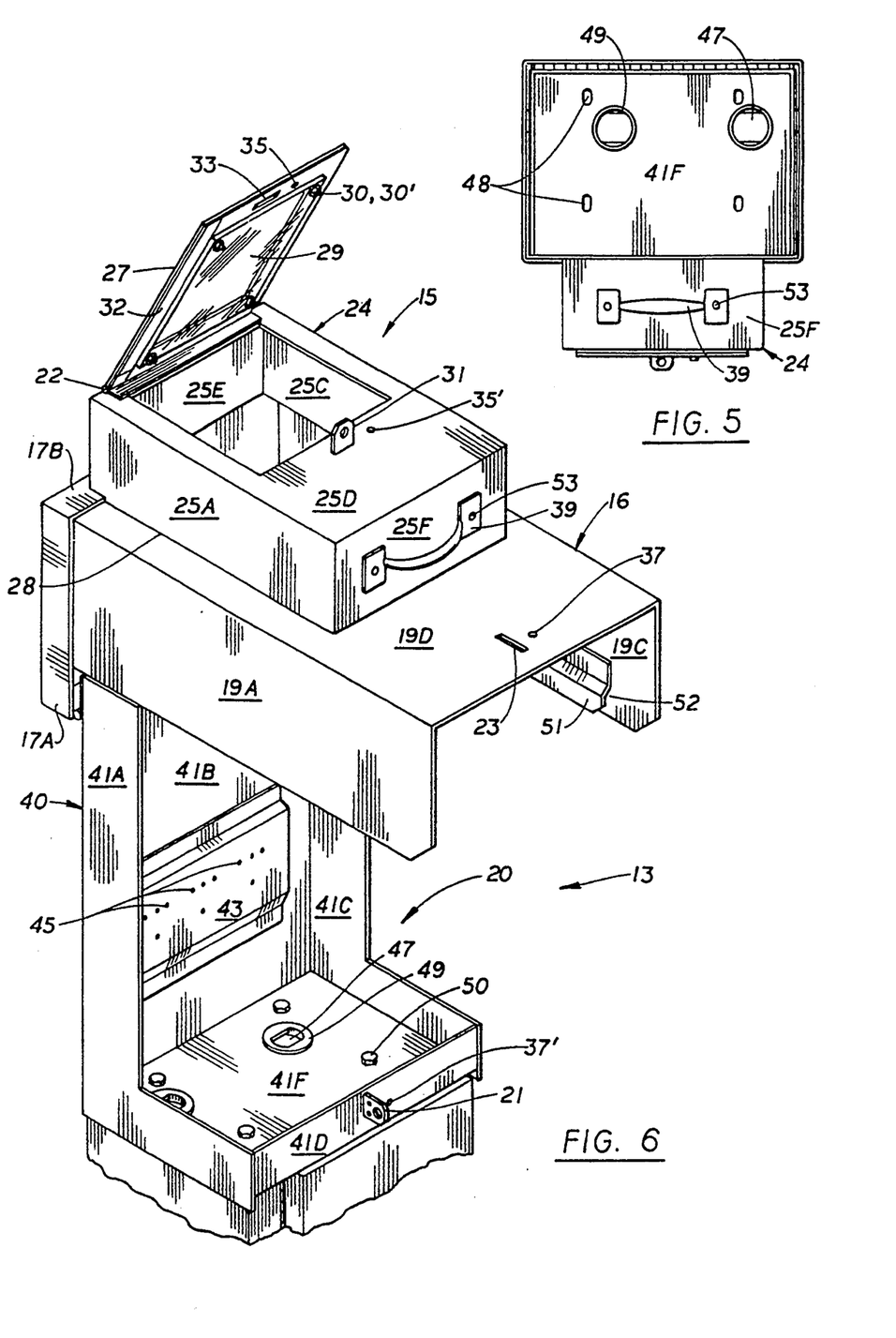
FIG. 5 is a view taken along the line V—V of FIG. 1.
FIG. 6 is a view similar to FIG. 1 wherein the upper portion sections are a partially open position and electrical equipment is removed.

Let us turn first to FIGS. 1 and 6 primarily for the elements comprising the first section of the upper portion. The first section includes a cover unit 16 comprising a cover 17 in an inverted open box configuration. It has a left wall 17A, a rear wall 17B—not seen in FIG. 1 but visible in FIG. 3—, a right wall 17C, a front wall 17D and a top wall 17E. A cutout 17' is provided in the front wall to accommodate the placement of the second section 15 in an abutting forward extending relationship. The cover 17 is hingedly connected to the third section's 14's upper body 40's rear wall 41B, preferably by a piano hinge. See FIGS. 3 and 6. First section 13's cover unit 16 also includes depending front wall 19D disposed from beneath cover front wall 17D, and almost equal in width thereto; left side wall 19A and right side wall 19C. Each of the spaced side walls may have a chamfered lower rear corner for aesthetics and/or ease and convenience of operation. The chamfers are also suggested for safety reasons in order to avoid a point facing the technician servicing the improved pedestal of this invention.

The two side walls 19A and 19C, preferably do not extend the full depth of the first section 13. The spacing between the side walls 19A and 19C is such that they are disposed exteriorly of the two side walls 41A and 41C of the upper body 40's third section. Walls 19 may be welded or otherwise attached to cover 17 in accordance with techniques known to the art.

As seen in FIG. 1 a staple 21, is mounted on short front wall 41D—which as is seen in FIG. 6 connects the two L-shaped sidewalls 41A, 41C of the third section. This staple extends forwardly through slot 23 for receipt of a padlock or wiring as a means to ensure nonaccess to the interior 20 of the first section 13. A bore 37 on front wall 19D is in alignment with threaded bore 37' within front wall 41D, when the upper section is in its closed position as in FIG. 1 in order to receive a bolt 36 as shown in FIG. 1 to removably secure the upper section in a closed position. Thus, the padlock not shown which would pass through staple 21 can be used for security purposes as may be required by the user, while the bolt serves merely to secure the cover unit in it's closed position as is deemed preferable in view of the fact that electricity is present.

Turning now to FIG. 6, it is seen that cover unit 16 also includes an offset alignment plate 51 disposed on the interior of each of the two walls 19A and 19C. This alignment plate is used to sandwich walls 41A and 41C in close proximity to walls 19A and 19C in elongated slot 52 when the cover unit is in its closed position as per FIG. 1. As is seen, the offset plate 51 is recessed slightly upwardly in order to provide clearance of the front wall 41D for opening of the cover unit. These offset plates 51 may be welded or adhesed to walls 19A and 19C's respective interior surfaces.

Typically the cover unit is dimensioned at approximately 9.5-inches deep, approximately 12.5-inches wide by about 20.5-inches in elevation. While there is no criticality to these dimensions, the various municipalities and other government agencies may set dimension requirements for service pedestals for their specification.

Figures 19, 20:
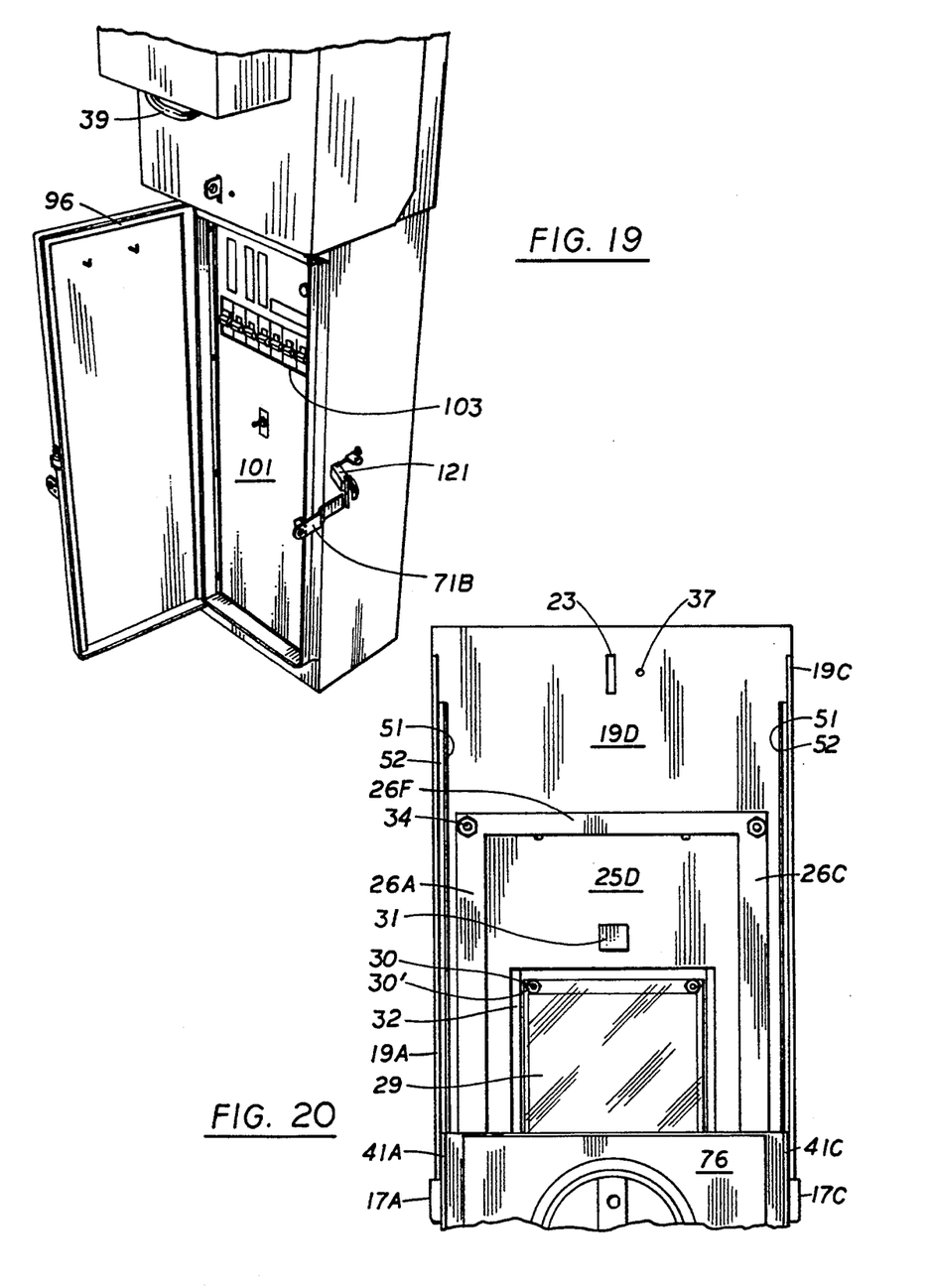
FIG. 19 is a front perspective view of the lower portion of this device with the interior door closed, but the exterior one open.
FIG. 20 is a close-up elevation showing the upper portion in a totally open position as seen from the front of the device.
Figure 21:
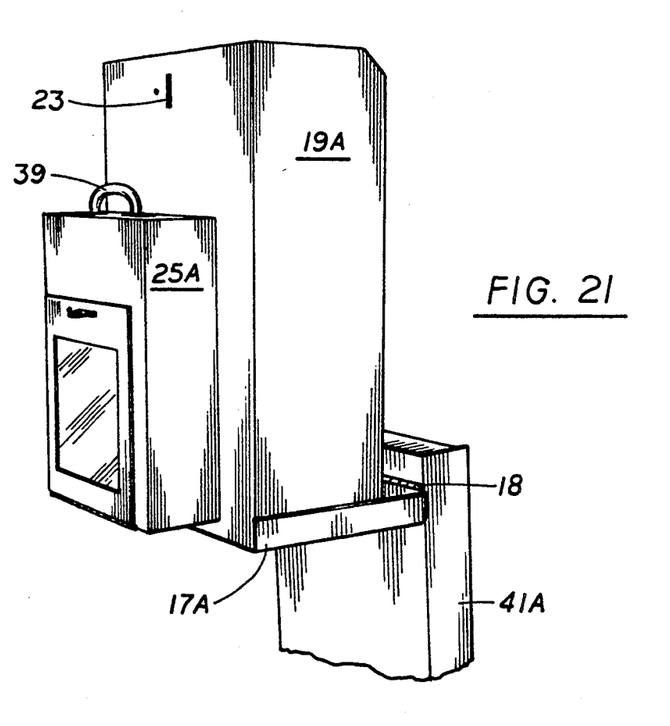
FIG. 21 is a rear perspective view showing the upper portion of the device in totally open position facing in the same direction as the rear lower portion.

The reader's attention is now turned to FIG. 20 which shows the cover unit of this invention in an upright open position. The disposition of each of the offset plates, 51, adjacent to each of the two side walls 19A and 19C provides an elongated space 52 there between, the purpose for which will be discussed infra.

One will also note that studs and nuts 34 are disposed in a spaced rectangular relationship around an opening 28 into which the secondary housing 24 can be passed for mounting. This secondary housing 24 includes side walls 25A and 25C, top wall 25E, front wall 25D and a bottom wall 25F, the last being seen in FIG. 5. Each of these walls 25 as denoted includes an interior flange 26 bearing the corresponding letter such as 26A, E, and F which are seen in the close-up view, FIG. 20. Secondary housing 24 is inserted through the opening 28 denoted in FIGS. 1 and 6 from the interior of the wall 19D.

At suitable spaced locations, studs 34 are, as noted above, mounted on the interior of said wall 19D for disposition in suitably aligned apertures—not numbered—which are found in each of the flanges 26. Nuts threadedly engaged upon the studs secures the flanges to the wall, the said studs and nuts together being designated 34. In addition to the just discussed corner mounting, flanges 26 are welded or otherwise secured in their entirety in position on the interior of front wall 19D.

Reference to FIG. 5 and 6 shows the optional, but highly recommended handle 39 secured by sheet metal screws, rivets or other fasteners 53, to the underside 25F of secondary housing 24.

An access cover 27 having a glass or polycarbonate face 29 as seen in FIGS. 1, 6 and 20 is provided to permit easy viewing of the electrical service meter (not shown) without having to open the entire upper portion of the apparatus of this invention. A continuous hinge 22 on the upper edge of access cover 27 allows access to the interior. Glass 29 is secured in place by having suitable bores made in the proper location for placement upon studs 30 for securement by nuts 30' as seen in FIG. 6. A gasket 32 is placed around the circumference along the edges of access cover 27 to ensure a rain-tight mating to the front wall 25D as is well understood in the art. See also FIG. 20. A staple 31 is provided on wall 25D for passage through a slot 33 in access cover 27, again for placement of a padlock not shown. An aperture 35 on cover 27 and a threaded apertures 35' on wall 25D are aligned for receipt of a bolt 36.

It is seen that in the closed position upper portion 11 has its secondary housing facing forward whereas when the upper portion's first section is in a partially open position as shown in FIG. 6 the secondary housing will, when its access cover 27 is opened face upwardly and when fully opened, as in FIG. 20, the access cover 27 faces rearwardly. It is seen therefore that the entire upper portion can be open to permit access to a meter or other device, or the access cover 27 alone may be opened or both may be opened as is seen in FIG. 6.

The exterior of lower portion 12 is seen in FIG. 1. Also seen in FIG. 1 is the lower left door 107, which is a removable door as will be described and the lower housing 104 which has a plurality of walls 106, the front wall, designated 106D is seen herein. Attached to this housing 104 by piano hinge 98 is lower front door 94.

Figures 13, 14:
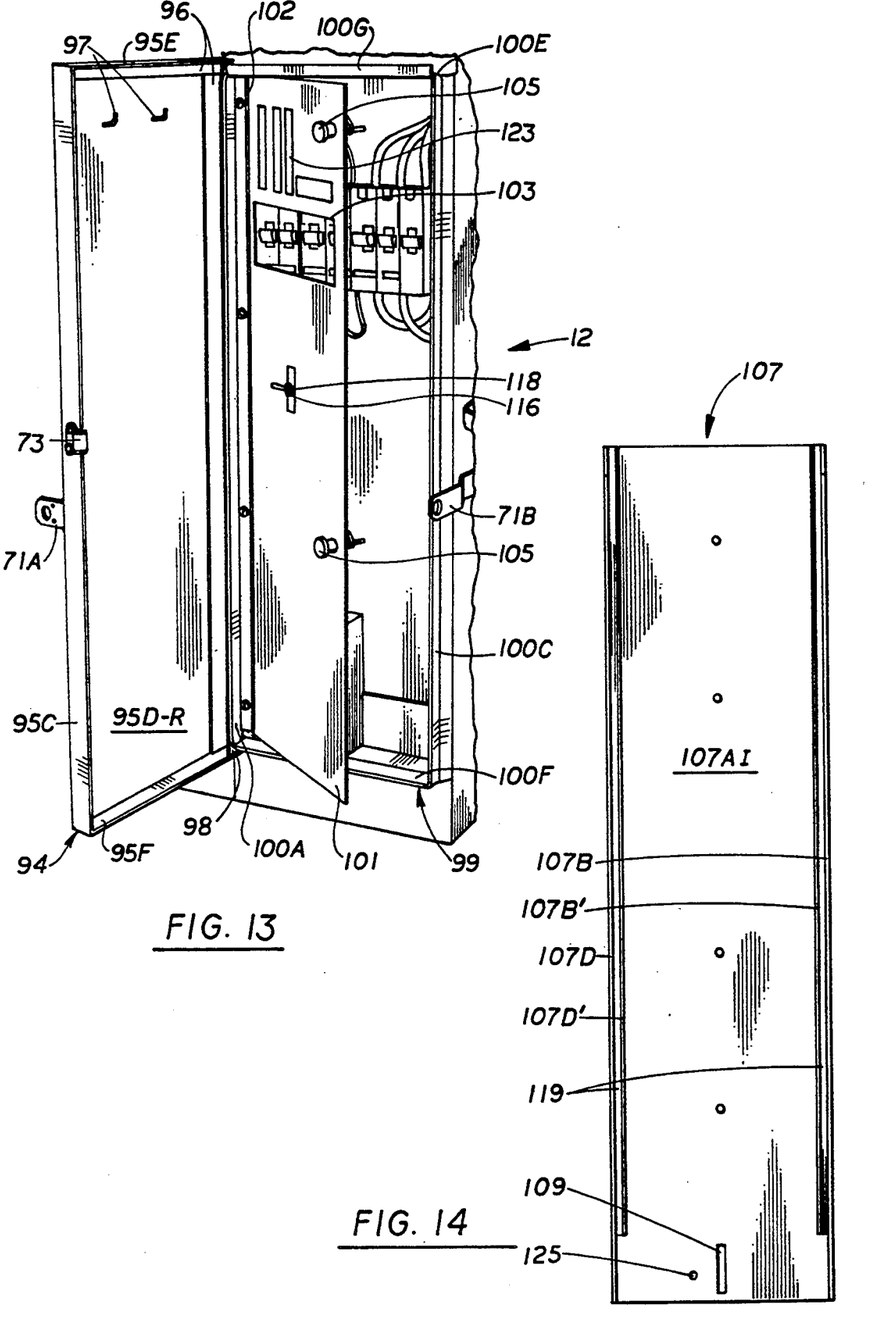
FIG. 13 is a front perspective view showing the exterior door's reverse face, and the lower interior door's obverse face, both doors being in open position.
FIG. 14 is an elevational view of the lower left door's interior.

Lower left door 107, which is fully removable includes a left facing panel 107A, a front panel 107D and a rear panel 107B not seen in this figure. Reference is also made to FIG. 14 wherein the interior surface of this door 107 is shown. Note the designations 107D' and 107B' for the spaced members that run full length adjacent the side panels 107D and 107B respectively, thereby creating elongated spaces 119, for reception of walls 135L and 135R therebetween when door 107 is disposed in place. The interior of panel 107 is designated as 107AI. Panels 107D and 107B are normally disposed along the exterior edges of left facing panel 107A. A plurality of handles 113 are welded, bolted or riveted at desired locations along the length of panel 107A.

A slot 109 is provided near the bottom of said panel 107A for staple 117 which is disposed behind panel 107A on wall 106A of the housing 104. An optional pair of aligned apertures one of them threaded for engagement by a bolt may be employed at a location adjacent slot 109 if desired to secure the lower left door in place, if not retained by a padlock not shown.

Figure 17:
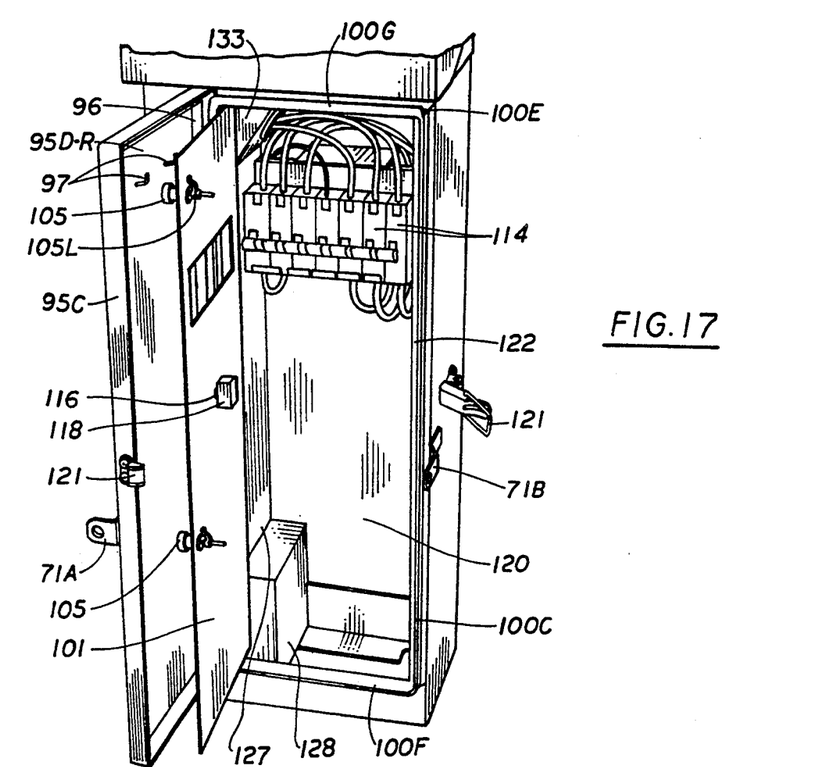
FIG. 17 is a right front perspective view of the lower portion showing the lower outer door open and the lower inner door's reverse face, as well as the interior of the lower portion.

A lower front door 94 which has a staple 71A extending forwardly therefrom along its right side wall at preferably at about the midpoint of its elevation is seen in FIG. 1, and FIG. 17 among others. This door 94 has side walls 95A and 95C, a front wall 95D, top wall 95E and a bottom wall 95F—the latter two being seen in FIG. 2.

Figure 2:
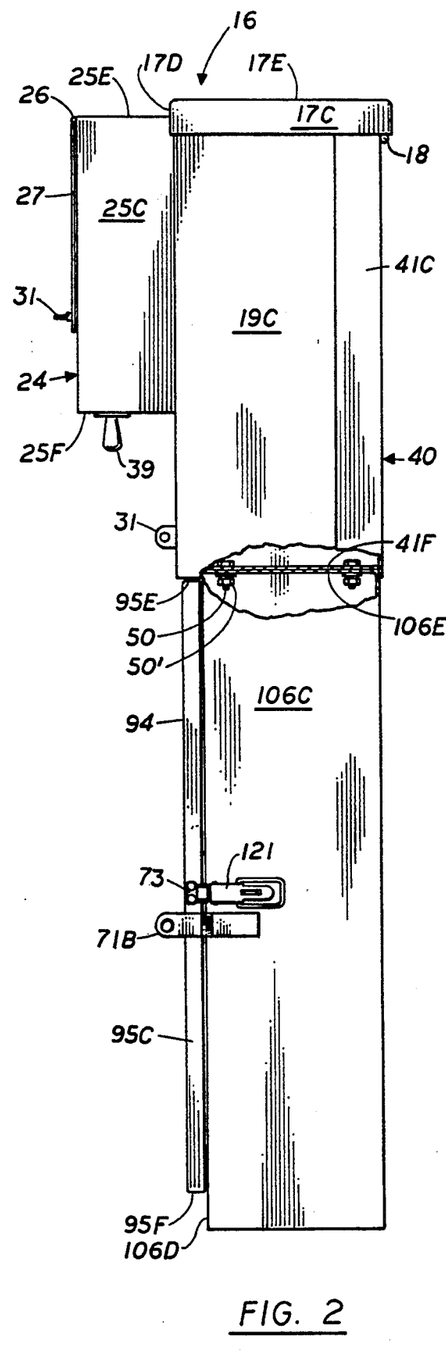
FIG. 2 is a right side elevational view thereof.

Also shown in FIG. 1, but seen better in FIG. 2 is a second staple 71B adjacent to and aligned with staple 71A. However, staple 71B is mounted as by riveting or some other suitable means to the side wall 106C as is shown in FIG. 2. Thus a padlock placed through the two aligned staples, 71A, 71B would secure the lower door 94 shut. Hasp 121 shown in FIG. 19 as well as in FIG. 17 has its catch 73, mounted to the front door side wall 95C to secure the door in a latched position if desired as when a padlock is not employed.

Also seen in FIG. 6, when the first section of the upper portion is in open position, hinged away from the third section. The bottom wall 41F, normal to the short horizontal member front wall 41D, has a pair of throughbores 47 therein for the disposition of wiring therethrough. Each of the throughbores 47 is surrounded by a suitable insulating grommet 49. At least two and preferably here as shown four, bolts 50 connect bottom wall 41F to top wall 106E of the lower portion as per FIG. 2. The bolts 50 are retained in place by suitable nuts 50'. One set of the bores 48 through which bolts 50 pass; namely, the bores in bottom wall 41F are visible in FIG. 5. The bores in the lower housing that align with the FIG. 5 set of four are not seen.

Figure 3:
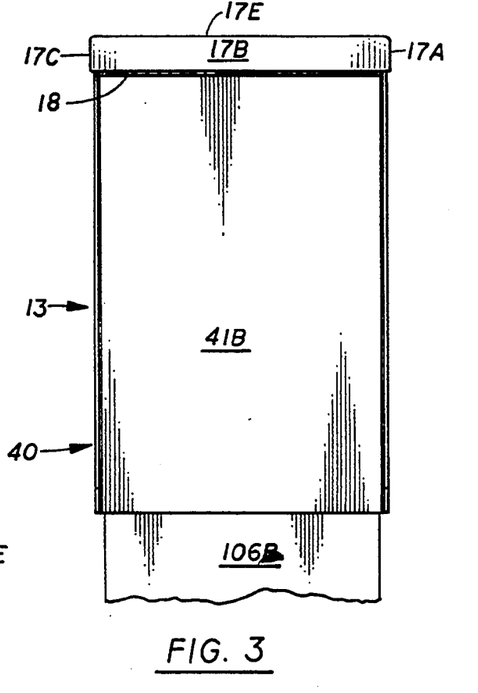
FIG. 3 is an upper rear close-up view.
Figure 4:
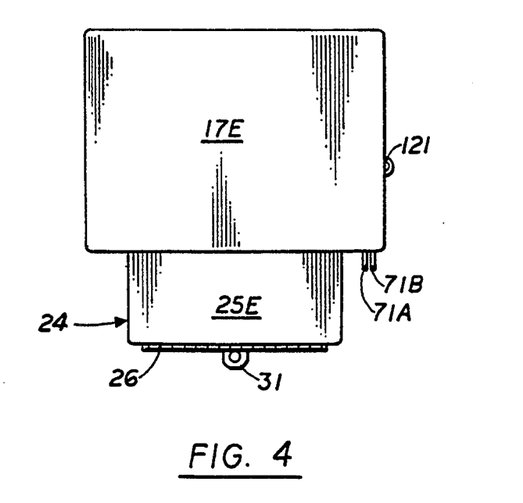
FIG. 4 is a top plan view of this device.

The reader's attention is now turned to the page of figures which include FIGS. 2, 3 and 4. It is believed that no details that have not been previously discussed are shown in any of these three views.

Figure 7:
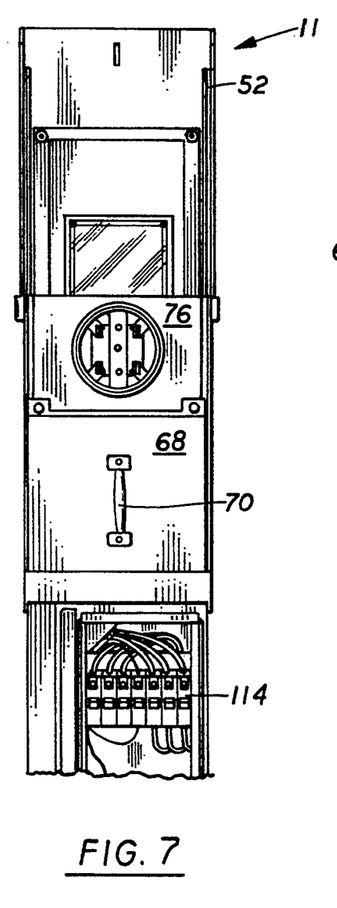
FIG. 7 with the left lower door in place, front lower door open, and the upper portion open.
Figure 8:
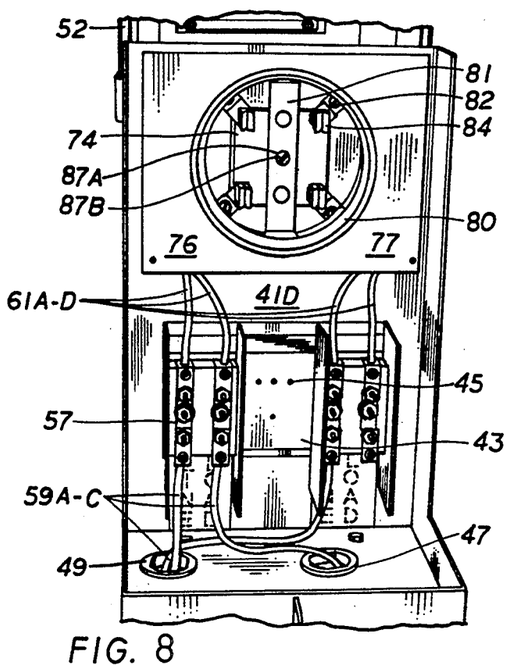
FIG. 8 is a close-up front perspective view of the upper portion.
Figure 9:
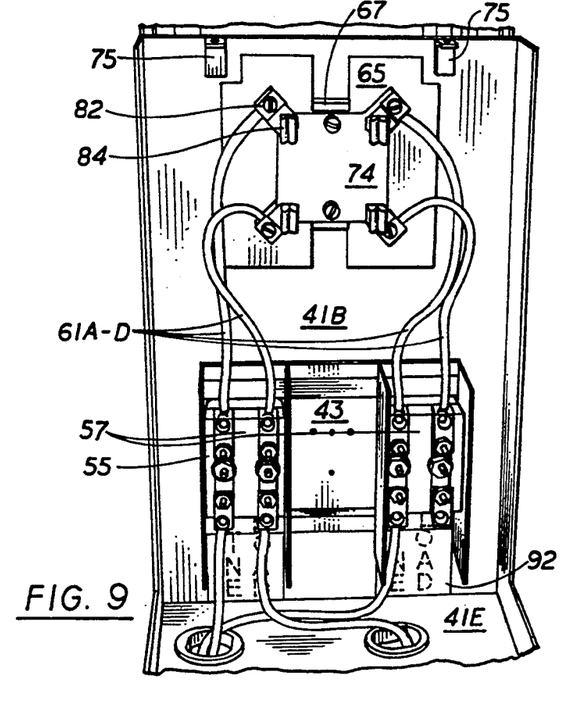
FIG. 9 is a view similar to FIG. 8 with the lower front door open and with the meter mount and the test block barrier removed.
Figures 10, 11, 12:
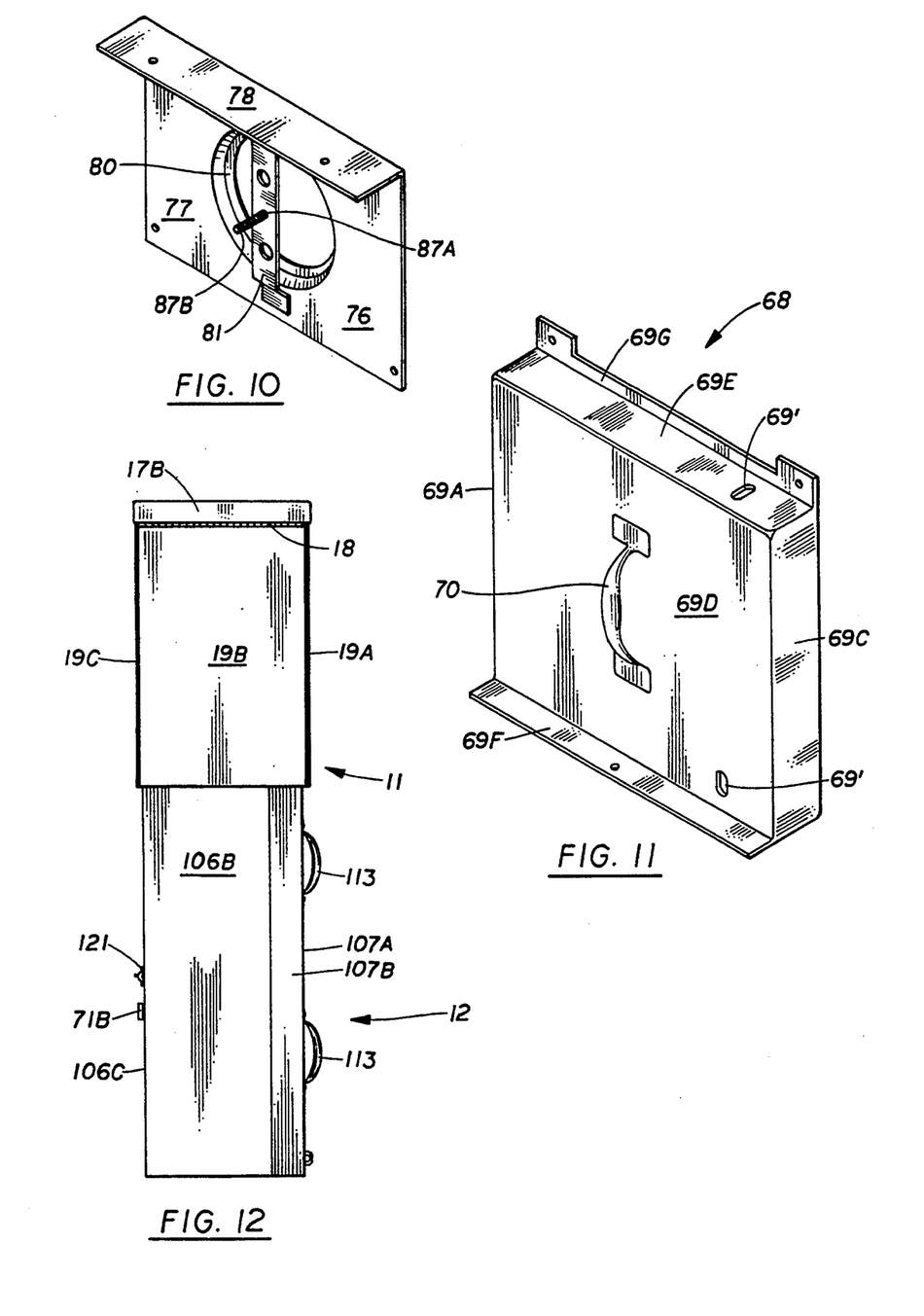
FIG. 10 is a rear isometric of the meter mount employed herein.
FIG. 11 is a front isometric of the test block barrier employed in this invention.
FIG. 12 is a total rear elevational view.

The reader's attention is now directed to FIGS. 7, 8, 9, 10 and 11. FIG. 7 illustrates the placement of the test block barrier 68 having a handle 70 thereupon, and the meter mount 76. These are visible when the upper portion 11 has its first section in an open position, i.e., rotated upwardly 180 degrees. Designator 114 is included at this point to show a series of circuit breakers in position, the details of which will be described when further comment is offered on the lower portion of this apparatus. FIG. 8, which is a closer up view than FIG. 7, shows the test block barrier removed but the meter mount still in place. FIG. 9 shows the meter mount device removed as well. Meter mount 76 which is shown from the anterior side in FIG. 7 in position within the upper portion 11's first section 13 is shown in its posterior side in FIG. 10. FIG. 11 shows the details of the test barrier block 68.

The meter mount 76 as seen from anterior side includes a main plate 77 and a top plate 78 seen in FIG. 10 disposed substantially normal thereto. A ring flange 80 sized in diameter to approximate the diameter of a conventional electric utility meter is mounted in a forward standing position relative to said main plate 77 as by welding. A mount bar 81, of a U-shaped configuration has the two end flanges disposed within the depth of said ring 80 with the bar center section being generally vertically disposed. This center section includes an aperture 87A and a bolt 87B to secure a meter mount 63 to the insulator 74 shown in FIG. 9. This insulator is in turn secured to a pair of meter mount standoffs 67 by suitable hardware also as seen in FIG. 9. The meter mount insulator 74 is seen in essence to be mounted to the wall 41D indirectly, since an insulation plate 65 is interposed therebetween. The meter mount insulator 74 includes two pairs of screw terminals 82 seen both in FIGS. 8 and 9, each of which has a knife-edge contact 84 associated therewith. Disposed lower on wall 41D is the terminal mount plate 43. This plate is configured such that it's central portion is offset from the wall to which it is mounted, in order to permit mounting sheet metal screws or bolts applied to other components to have a receiving space without the necessity of puncturing rear wall 41B. These aforesaid components are to be screwed to mount plate 43's plurality of receiving apertures 45, per FIG. 6.

Terminal blocks such as those designated 57 or other components can be mounted to terminal mount plate 43 in accordance with standard procedures and insulted from metal by insulator 55.

Also visible in this figure are the insulator grommets 49 surrounding throughbores 47, through which are passing incoming wires designated 59A through 59C, and connecting wires 61A through 61D which go from the four respective contacts to the meter mount insulator as seen in FIG. 9.

The discussion now turns to FIG. 9. Here the insulation plate 65 that is interposed between wall 41B and the meter mount insulator 74 is more readily seen. Such insulation sheets maybe glued in place in a configuration suitable for the situation.

Disposed adjacent the insulation plate 65 are a pair of inverted L-shaped brackets, 75. These serve to provide a location for landing of the electrical lines associated with the utility meter and a receptacle for plugging in the utility meter.

While forming no part of this invention, decals 92 may be placed on rear wall 41B adjacent or below (as here) the terminal mount plate 43 to indicate the coding for the incoming wiring. In FIG. 10, the rear view of the meter mount 76 is seen. Thus, bottom plate 78 normal to the main vertical plate 77 is visible in this view whereas it is not visible in the front view of FIG. 8. FIG. 10 also gives a better representation of aperture 87A and the mounting bolt 87B which are also seen in FIG. 8.

Attention is now turned to FIG. 11 which is a close-up perspective view of element 68, the test block barrier seen in FIG. 7 as well. The test block barrier is configured as a five sided box having the rear side open. Thus the side walls of barrier 68 are designated 69A and 69C while the front wall is 69D. The top and bottom walls are designated 69E and 69F respectively. Note, however, that bottom wall 69F has been rotated 180 degrees to thrust out forwardly rather than rearwardly as is readily visible in FIG. 11. A handle 70 is mounted at a convenient location as by rivets or by welding. A wire slot 69' is shown at a convenient location at the lower right corner of the test block barrier. A second optional wire slot is shown on the top wall 69E situated at a convenient location.

Mounting of the test block barrier 68 is accomplished by the upstanding flange 69G which includes a pair of spaced segments having apertures therein for disposition on studs disposed in the lower corners of the meter mount 76. Such bolts and nuts used to secure the test block barrier in place are not visible in these drawings. Flange 69G is disposed at the rear of wall 69E and is generally normal thereto.

FIG. 12 is a full elevational view of the apparatus of this invention. One can readily see the rear wall 17B of cover 17 and the hinge 18 connecting cover unit 16 to the rear wall of the upper portion 11; namely, 19B. Also visible in this view is the lower portion's rear wall 106B. Hinge 18 may be omitted such that first section including cover unit 16 is entirely removable from the apparatus.

The reader's attention is now turned to FIG. 13 which illustrates the lower exterior door in open position whereby the reverse side can be seen and the lower interior door wherein the obverse side can be seen. The lower front or exterior door 94 includes a plurality of spaced walls 95; namely, side walls A and C front wall 95D, not seen in this figure and top and bottom walls 95E and 95F. The designation 95D-R serves to illustrate that this is in fact the reverse side of that door. The hook clamp or catch 73 is readily seen in this figure as are the two spaced staples 71A and 71B. Surrounding the perimeter of the reverse side of this door is gasket 96 which serves to keep moisture out. One or more spaced hooks 97 are welded to the interior or reverse side front panel 95D-R for the suspension of charts and other data. A piano hinge 98 (not seen) which is secured to wall 95A and to front wall 106D permits door 94 to be opened. See also FIG. 1. Disposed inwardly in size slightly smaller than the dimension height and widthwise of door 94 is door frame 99 having spaced side walls 100A and 100C, top wall 100E, bottom wall 100F and a top front upstanding flange 100G. Flange 100G is disposed normal to top wall 100E.

Disposed within this frame 99 is the lower inner or interior door 101o This door 101 seen in FIGS. 13 and 17 is also hingedly mounted on piano hinge 102.

Within door 101 is a generally rectangular cutout 103 spaced down from the top to provide egress for the circuit breakers, 114 with actuating levers projecting forwardly through opening 103 for actuation. See FIG. 17. Also disposed within door 101 is toggle switch 118 which is mounted in aperture 116 as seen in FIG. 17. In some instances, this toggle switch may not be present, depending upon the configuration of the interior of the pedestal. Indeed, more than one such toggle switch could be present as the situation may require. Spaced at suitable locations along the elevation proximate the right-hand edge of the door 101 are the latch handle twist bolts 105 two of which are depicted in FIG. 13. They are utilized to secure door 101 in a closed position. The latching portion of these bolts is visible in FIG. 17 and each is designated 105L. These bolts latch by 90 degree rotation behind latch plate 122 which runs substantially the entire elevation of the interior 120 of the lower portion 12. Again see FIG. 17.

Optionally mountable on the door above the circuit breakers are indicia panels 123. These may be glued to door 101 or mounted by sheet metal screws. They serve to indicate the function of the circuit breaker disposed therebeneath.

Figure 15:
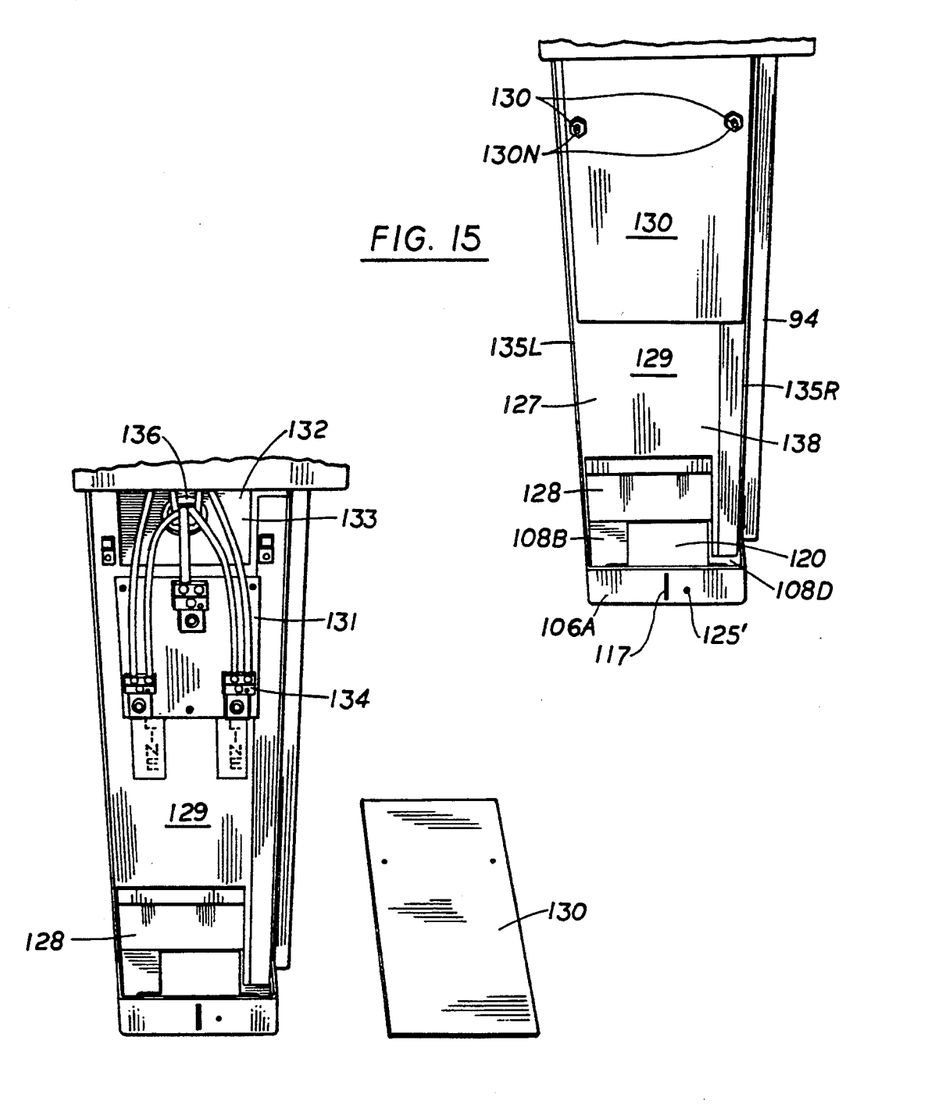
FIG. 15 is a lower left side perspective view similar to FIG. 12 but wherein the left side cover has been removed.
Figure 16:
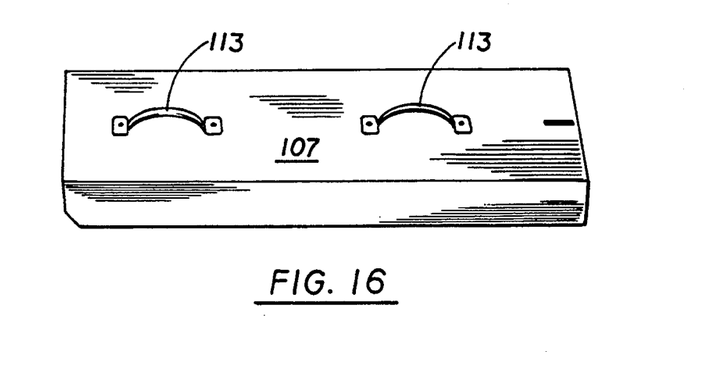
FIG. 16 is firstly, a left perspective view of the interior of the lower portion of the invention, as well as showing secondly a left perspective of the exterior of the removed left lower door—which door's interior is seen in FIG. 14—and thirdly showing an uninstalled barrier plate.

The discussion now turns to FIG. 14 which depicts the reverse side of the lower left door 107 seen in FIG. 1 and in FIG. 16 where the exterior side of said door is shown. Thus in partial repetition, the interior surface of wall 107A is designated 107AI. Spaced from each of the outer walls 107B and 107D are a pair of spaced elongated plates 107B' and 107D' each of which is parallel to the respective outer wall and together with which forms a space 119 for disposition of race way walls 135L and 135R as seen in FIG. 15 when said door 107 is inserted into position. Door 107 may at its upper corners as shown here in FIG. 14 have them chamfered to ease the fit of the door upon the raceway members 135L and 135R. Note also that optionally the corners of elements 107B' and 107D' can also be cutaway as shown in FIG. 14, again to ease mounting of the door into position.

Disposed within the bottom of panel 107A is slot 109 through which extends staple 117 visible in FIG. 15. Said staple is shown disposed outwardly from inner side wall 106A.

In FIG. 14 there is also seen a bolt hole 125 for securing the door 107 into a fixed position without the use of a padlock passing through said staple. An aligned threaded aperture 125' is disposed next to the staple as per FIG. 15.

Figure 18:
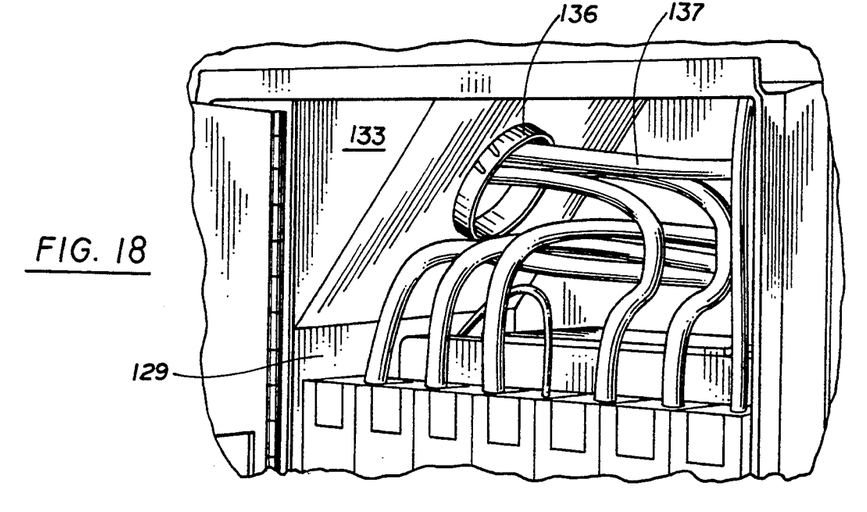
FIG. 18 is a close-up view of an area of FIG. 17.

The discussion now continues with respect to FIG. 15. This figure depicts the interior area between door 107 (not shown in this figure) and the raceway 127. The raceway as depicted here is designated a stepped and swept raceway in that it has a step 128 at the bottom thereof and a triangular swept zone 133 as seen in FIG. 17 at the top thereof. The interior of said raceway is defined by wall 129 and the aforementioned step at the bottom thereof 128 which communicates to open space 120 which communicates with the street or ground below. The raceway terminates at its upper end in the swept portion 133 which commences at the upper end of raceway wall 129. See also FIG. 18 which shows this junction. While said raceway in many instances will contain only wiring, there are times when a barrier plate 130 may be employed by bolting two studs 130' using nuts 130N all of which are seen in FIG. 15. It may as in the case depicted in FIG. 16 for a particular installation be necessary to include terminals and other wiring components none of which form part of this direct invention.

In other instances, raceway barrier plate 130 will be omitted.

The raceway in essence defines a spatial volume 138. It is seen that in addition to panel or wall 129, which is spaced from door 107 there are also present and normal to each of said elements 129 and 107 the raceway side members 135L and 135R. Also seen in FIG. 15 is base wall 108B also seen in the bottom plan view FIG. 22. Note also the presence of front door 94.

The next figure for discussion is FIG. 16. The presence of the miscellaneous electrical components 134 or their absence within the raceway has already been alluded to.

Recess 132 is the interior of the swept zone of the raceway 133 as shown in FIG. 17. This communicates with the grommet 137. When these miscellaneous electrical components 134 are employed a barrier 131, which is electrically insulated, is utilized. See FIG. 16. This insulated barrier differs from the one spaced therefrom and designated 130 which is also seen removed from its normal disposition in this figure.

FIG. 17 illustrates many of the components previously discussed such as the raceway 127 and its step section 128. Hasp 121 previously discussed is also seen on the right side wall.

The discussions moves now to an optional grommet 136 which is employed on the swept section of the raceway. In some instances this grommet will not be present and all wiring present in the raceway will lead to the upper portion of the apparatus. For the embodiment here as seen and specifically since the circuitry and wiring form no part of this invention it is seen that raceway wiring 137 is entering from the raceway to the circuit breakers previously referred to. FIG. 19 has had its components previously discussed and is present strictly as a condition indicator, namely to show that the interior lower door can be closed while the exterior lower door is open.

Figure 22:
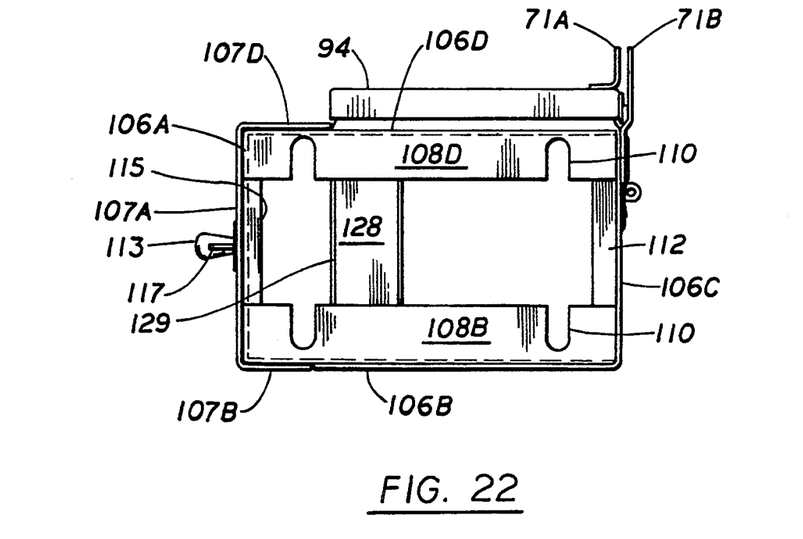
FIG. 22 is a bottom view of the lower portion.

The last figure to be discussed is FIG. 22 which is the bottom view of this apparatus. Here base 108 is formed from a plurality of walls or plates; namely, the front plate designated 108D which is preferably formed as a 180° fold at the lower end of the housing wall 106D. The same is true of the its opposite companion 108B which is a continuation of wall 106B. These two plates 108D and 108B are spaced from each other yet tied together by walls, a flange plate 115 which is disposed normal to inner side wall 106A and is formed preferably integral therewith; as well as a connecting and reinforcing bar 112 which extends over and between walls 108D and 108B. Bolt cutouts 110 are used for mounting of this apparatus onto a concrete or other base not shown. Staple 117 is also seen in this bottom plan view, as are the raceway step 128 and the lower exterior door, 94.

It is common usage in the industry to utilize service pedestals on a supporting surface such as street, sidewalk or concrete pad. Upstanding suitably spaced threaded bolts may be provided to align with the bolt cutouts, elements 110 as shown in the bottom plan view FIG. 22. Nuts are then threaded onto the bolts over optional washers to secure the pedestal to its support. More often than not these spaced bolts surround an opening in the support through which the utility lines emanate for introduction into the pedestal. Such mounting and line introduction are standard in the industry. It can be seen that underground utilities may quickly and easily connect their lines to the pedestal without any cables being visible from the exterior.

It can be seen from the above discussion that a service pedestal has been disclosed that is of significant improvement over the pedestal disclosed and claimed in my U.S. Pat. No. 3,906,295 in several ways. As alluded to earlier the instant pedestal can be positioned within 18 inches of a building, rather than having to be three or more feet away. This is due to the fact that workers have side access to the race way for wiring, and because even when the first section of the upper portion is raised up and tilted back 180 degrees the rearward projection is less than 18 inches. Thus the landscape is not only beautified, but blind and otherwise impaired citizens have less fear of bumping into pedestals which no longer need be positioned out on the sidewalk.

The ability to access the raceway independently from the side, distinct and away from controls, meters, and power distribution hardware accessed from the front, permits each user of the pedestal to work separately without having to coordinate schedules. This helps each party feel assured that Utility A will not mess with that part of the pedestal belonging to User B, and vice versa.

The pedestal of this invention is capable of various wiring patterns and of holding a multitude of different types of equipment for different needs, ranging from the control of traffic lights, to the control of street lights, to the operation of pumping stations and even to the control of railroad track switching systems. Thus the placement of the particular components discussed herein and shown in the drawings is merely exemplary of the various configurations possible by simple wiring changes, equipment changes, and minor modifications of the all within the skill of the art.

For example it is readily seen that an aperture and grommet could be placed in the swept portion at the top of the raceway to run wiring directly to the area behind the lower interior door, rather than to the upper area of the interior of the pedestal. Another example would be the replacement of some or all of the circuit breakers shown accessible through the interior door, by toggle switches. Or the circuit breakers could be accessible only by opening the interior door, if the cut out for them were not to be provided.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. An improved service pedestal for an electrical control system, which pedestal is adapted to be mounted on a supporting surface and which is configured as a vertically oriented box like structure, which pedestal comprises:

A. an upper portion and;
   B. a lower portion, connected to said upper portion to form a unified structure, and which lower portion is adapted to be mounted to a supporting surface and;

wherein said upper portion includes a first section and a cover unit for said first section, a second section and a third section;

wherein the upper portion comprises:
   a. said first section having spaced sidewalls, each connected to a front wall, and
   b. the cover unit comprising a cover having an inverted open box configuration of a top wall, spaced front and rear walls, and spaced side walls normal to said front and rear walls;

said cover unit also having the second section mounted on the front thereof and communicating therewith,
   c. the third section comprising spaced sidewalls disposed normal to a rear wall and being generally open at the front and top, said first section being pivotally mounted to said third section for upward movement of said first section, and wherein the lower portion contains a raceway in communication with the upper portion for the delivery of cabling from said lower portion to said upper portion.

2. In the apparatus of claim 1 wherein the upper portion's first section has a front wall of finite height and finite width, and second section comprises a box having spaced side walls, normal to spaced top and bottom walls, a front wall of lesser height and width than said first's section's front wall, said second section's front wall having means for viewing through the second section into the first section of the upper portion.

3. In the apparatus of claim 1 wherein means are provided for communication between said upper portion and said lower portion.

4. In the apparatus of claim 1 wherein the upper portion and the lower portion are separated by a common wall having communication means between the two portions therein.

5. In the apparatus of claim 2 wherein the second section has its front wall sized smaller than the front wall of said first section, and said bottom wall includes a handle for pivotally raising said first and second sections together.

6. In the apparatus of claim 2 wherein the raceway is of a stepped and swept configuration.

7. In the apparatus of 4 wherein the interior of the lower portion is defined by said common wall, a right side wall, the raceway and a front door, thereby forming a cabinet, generally open at the bottom.

8. In the apparatus of claim 5 wherein the front wall of said second section includes an opening overlaid by an access cover.

9. In the apparatus of claim 8 wherein the access cover is pivotally mounted and includes a transparent pane for visual access to the interior of said first section.

10. In the apparatus of claim 9 further including meter mount means, visible through said transparent pane when no meter is present.

11. In the apparatus of claim 1 further including at least one terminal mount plate disposed in said third section.

12. In the apparatus of claim 1 wherein the third section includes both of a terminal mount plate and a meter mount means.

13. In the apparatus of claim 12 wherein the upper portion's first section has a front wall of finite height and finite width, and the second section comprises a box having spaced side walls, normal to spaced top and bottom walls, a front wall of lesser height and width than said first's section's front wall, said second section's front wall having means for viewing through the second section into the first section of the upper portion.

14. In the apparatus of claim 2 wherein the upper portion's first section's pivotal mounting to said third section comprises a piano hinge disposed horizontally along the exterior of the rear wall of said third section, and said third section has generally L-shaped side walls.

15. In the apparatus of claim 14 wherein the front wall of said second section includes an opening overlaid by an access cover having a transparent pane.

16. An improved service pedestal for an electrical control system, which pedestal is adapted to be mounted on a supporting surface and which is configured as a vertically oriented box like structure, which pedestal comprises:

A. an upper portion and;

B. a lower portion, connected to said upper portion via a common wall to form a unified structure, and which lower portion is adapted to be mounted to a supporting surface and;

wherein said upper portion includes a first section and a cover unit for said first section, a second section and a third section;

wherein the upper portion comprises:

a. said first section having spaced side walls, each connected to a front wall, and, b. the cover unit comprising a cover having an inverted open box configuration of a top wall, spaced front and rear walls, and spaced side walls normal to said front and rear walls;

said cover unit also having the second section mounted on the front thereof and communicating therewith, c. the third section comprising spaced L-shaped sidewalls connected by a short upstanding horizontal front member and a rear wall disposed normal to said sidewalls, is generally open at the front and top, said first section being pivotally mounted to said third section's rear wall for upward movement of said first section;

and wherein the lower portion comprises a rear wall, one sidewall, a top wall and removable lower side door and said lower portion contains a raceway in communication with the upper portion for the delivery of cabling from said lower portion to said upper portion, said raceway being accessible upon removal of said lower side door.

17. In the apparatus of claim 16 wherein the raceway, the rear wall and the side wall of the lower portion define an interior cabinet, which interior cabinet is closed off by at least one door.

18. In the apparatus of claim 17 wherein the interior cabinet is closed off by a front interior door and a front exterior door, neither of which accesses the raceway.

19. In the apparatus of claim 16 wherein said lower side door includes at least one handle and the front exterior door is mounted to the front wall of the lower portion.

20. In the apparatus of claim 18 wherein the lower side door also includes a center panel and two side panels normal to said center panel, and which lower side door when in place overlies the front and rear walls of the lower portion.

21. In the apparatus of claim 18 wherein the lower exterior door includes mounting hooks on the inside surface thereof.

22. In the apparatus of claim 18 wherein the lower interior door includes a cutout therein which aligns with electrical components mounted in said lower portion.

23. In the apparatus of claim 7 wherein the lower portion includes a front door having a cutout therein which cutout aligns with electrical components mounted in said lower portion's cabinet.

24. An improved service pedestal for an electrical control system, which pedestal is adapted to be mounted on a supporting surface and which is configured as a vertically oriented box like structure, which pedestal comprises:

A. an upper portion and,

B. a lower portion, connected to said upper portion via a common wall to form a unified structure, and which lower portion is adapted to be mounted to a supporting surface and, wherein said upper portion includes a first section and a cover unit for said first section, a second section and a third section;

wherein the upper portion comprises:
- a. said first section having spaced side walls, each connected to a front wall,
- b. the cover unit comprising a cover having an inverted open box configuration of a top wall, spaced front and rear walls, and spaced side walls normal to said front and rear walls;

said cover unit also having the second section mounted on the front thereof and communicating therewith,

- c. the third section comprising spaced sidewalls disposed normal to a rear wall and being generally open at the front and top, and having a meter mount and a terminal block mounted therein, said first section being pivotally mounted to said third section for upward movement of said first section;

and wherein the lower portion comprises a generally rectangular structure defined by a rear wall, one sidewall, a top wall and removable lower side door and, said lower portion contains a raceway in communication with the upper portion for the delivery of cabling from said lower portion to said upper portion, said raceway being accessible upon removal of said lower side door;

and wherein the raceway, the said rear wall and the said side wall of the lower portion define an interior cabinet, which interior cabinet is closed off by a hingedly mounted interior door, having a cutout therein, and which lower interior door has a hingedly mounted exterior door in front thereof.

25. In the apparatus of claim 24 wherein the first section of said upper portion has a front wall of finite height and finite width, and said second section extends forwardly from said first section, and has a front wall of lesser height and width than the front wall of said first section, said second section's front wall having an opening therein overlaid by an access cover.

26. In the apparatus of claim 25 wherein the access cover is hingedly mounted and contains a transparent pane.

27. In the apparatus of claim 26 wherein said second section includes a handle and the front wall thereof has a staple mounted thereon, which staple passes through a slot in said access panel.

28. In the apparatus of claim 1 wherein the lower portion comprises a rear wall, one sidewall, a top wall and removable lower side door overlying said raceway.

29. An improved service pedestal for an electrical control system, which pedestal is adapted to be mounted on a supporting surface and which is configured as a vertically oriented box like structure, which pedestal comprises:

A. an upper portion and,

B. a lower portion, connected to said upper portion to form a unified structure, and which lower portion is adapted to be mounted to a supporting surface and, wherein said upper portion includes a first section, a second section and a third section;

wherein the upper portion's first section comprises:
- a. a cover unit comprising a cover having an inverted open box configuration of a top wall, spaced front and rear walls, and spaced side walls normal to said front and rear walls;

said cover unit also having the second section mounted on the front thereof and communicating therewith, said second section comprising spaced sidewalls, and spaced top and bottom walls normal to the second section sidewalls, and being selectively closed off at the front,

- b. a third section comprising spaced sidewalls disposed normal to a rear wall and being open at the front and top, said first section being pivotally mounted to said third section for upward movement of said first section, wherein the lower portion comprises a rear wall, one sidewall, a top wall, a front wall having a lower outer door mounted thereto, and a sidewardly accessible raceway not accessible through said lower outer door.

30. In the apparatus of claim 29 wherein a removably mounted lower side door overlays said raceway whereby access to said raceway is gained by removal of said lower side door.

31. In the apparatus of claim 29 wherein said second section includes a handle on the front wall thereof, and an access panel having a slot therein, which front wall has a staple mounted thereon, which staple passes through the slot in said access panel.

32. In the apparatus of claim 29 wherein the raceway of the lower portion is stepped and swept.

33. In the apparatus of claim 32 wherein the lower portion includes a front outer door and a front inner door behind said outer front door, said inner door providing access to the interior of said lower portion, but not to said raceway.

34. In the apparatus of claim 4 wherein the means for communication between the upper portion and said lower portion is an insulated opening in the wall that separates said portions.

35. In the apparatus of claim 33 wherein the front inner door together with the raceway and the rear wall and a sidewall of said lower portion define a lower cabinet sealed off from the environment when said inner door is in a closed position.

36. In the apparatus of claim 29 wherein the raceway of the lower portion's swept section passes through said lower cabinet to communicate with the interior of the upper portion.

37. In the apparatus of claim 32 wherein the raceway also communicates with said lower cabinet.

38. In the apparatus of claim 33 wherein the front outer door is hingedly attached on one side thereof, and said door has a staple along the edge on the side opposite the hinge, and the lower portion has a sidewall with a staple mounted thereto in alignment with the staple on said front outer door.

39. In the apparatus of claim 7 further including means in the bottom of the lower portion's cabinet for mounting of the apparatus to a surface.

40. An improved service pedestal for an electrical control system, which pedestal is adapted to be mounted on a supporting surface and which is configured as a vertically oriented box like structure, which pedestal comprises:

A. an upper portion and,

B. a lower portion, connected to said upper portion via a common wall to form a unified structure, and which lower portion is adapted to be mounted to a supporting surface and, wherein the lower portion comprises a generally rectangular structure defined by a rear wall, one sidewall, a top wall and removable lower side door and said lower portion contains a raceway in communication with the upper portion for the delivery of cabling from said lower portion to said upper portion, said raceway being accessible upon removal of said lower side door;

and wherein the raceway, the said rear wall and the said side wall of the lower portion define an interior cabinet, which interior cabinet is closed off by a hingedly mounted lower interior door, having a cutout therein, and which lower interior door has a hingedly mounted exterior door in front thereof.

41. In the apparatus of claim 40 wherein the raceway is stepped and swept.

42. In the apparatus of claim 40 wherein there is a front interior door and a front outer door the latter of which is hingedly attached on one side thereof, and said door has a staple along the edge on the side opposite the hinge, and the lower portion has a staple mounted on a sidewall thereto in alignment with the staple on said front outer door.

43. In the apparatus of claim 40 wherein a plurality of circuit breakers are disposed in the cabinet of the lower portion and are accessed through an opening in the lower interior door.

* * * * *